Aug. 21, 1962  J. M. BROOKE  3,050,368
METHOD AND APPARATUS FOR PEROXIDE PRODUCTION
Filed June 2, 1958
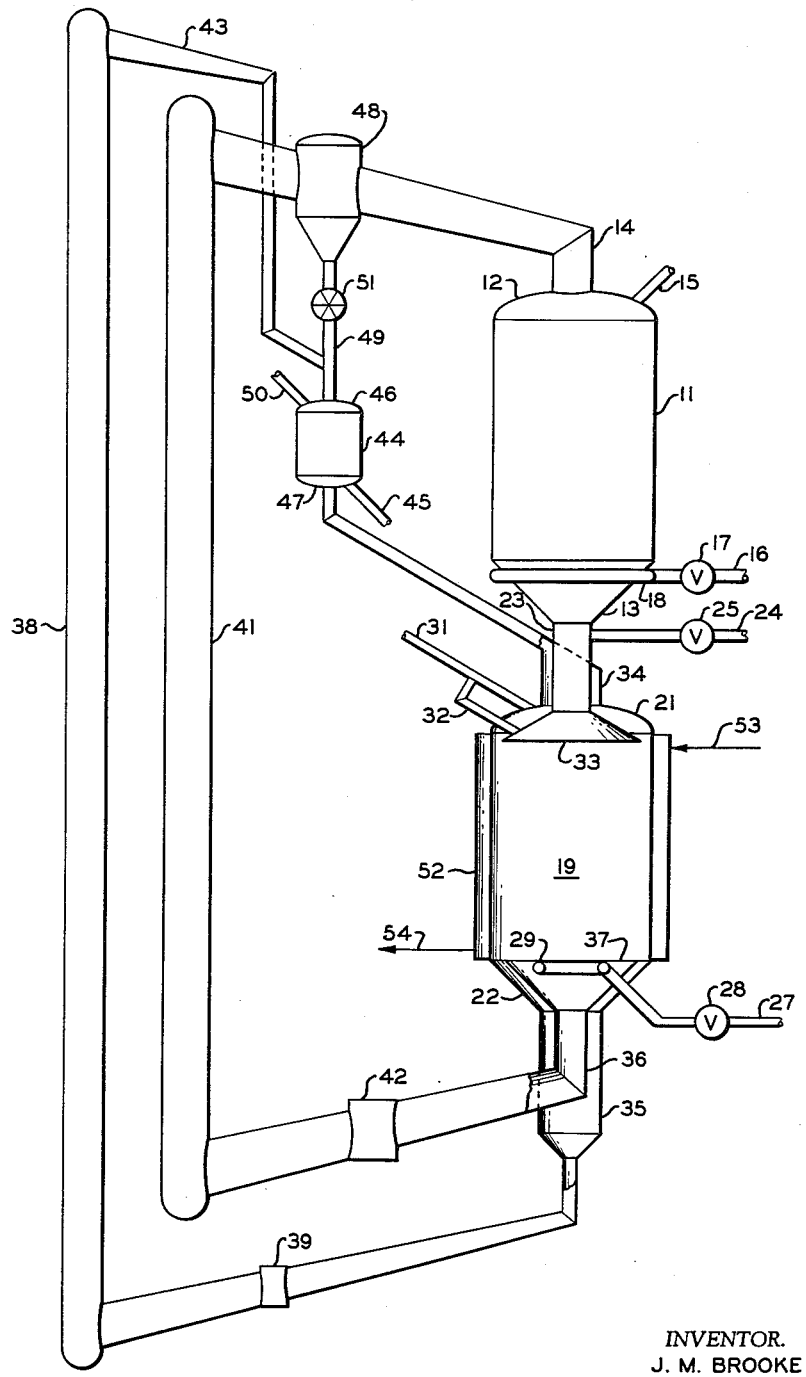
INVENTOR.
J. M. BROOKE
BY Hudson and Young
ATTORNEYS United States Patent Office 3,050,368
Patented Aug. 21, 1962

3,050,368
METHOD AND APPARATUS FOR
PEROXIDE PRODUCTION
Jesse M. Brooke, Sweeny, Tex., assignor to Phillips
Petroleum Company, a corporation of Delaware
Filed June 2, 1958, Ser. No. 739,240
13 Claims. (Cl. 23—207)

This invention relates to method and apparatus for peroxide production.

Organic peroxides and hydrogen peroxide are becoming increasingly important articles of commerce. Older methods for producing these materials are quite expensive and, in the past few years, it has been found that the materials can be made by subjecting normally gaseous aliphatic hydrocarbons to a non-catalytic, incomplete and controlled oxidation. By proper control of the starting materials, the temperature, and the reaction time, it is possible to make hydrogen peroxide at a cost substantially lower than prior art methods. The reaction itself does not constitute a feature of my invention and for details thereof, not set forth hereinafter, attention is directed to an article by Sherwood, starting at page C–42 of "The Refining Engineer" for October 1957.

The following are objects of my invention.

An object of my invention is to provide an improved process for the production of organic peroxides and, particularly, hydrogen peroxides. A further object of my invention is to provide new apparatus for this reaction. A further object of my invention is to provide a modification of pebble heater apparatus so that it is adaptable to the production of hydrogen peroxide by the partial oxidation of a hydrocarbon.

Other objects and advantages of the present invention will be apparent to those skilled in the art upon reading this disclosure, accompanying and forming a part of which, is—

A drawing showing in schematic form and partly in section suitable apparatus for carrying out the method of my invention.

Broadly, the invention comprises a method of operating pebble heater apparatus for producing peroxide compounds comprising the steps of heating a mass of pebbles to a temperature of 550 to 950° F.; gravitating the heated pebble mass downwardly through a reaction zone as a contiguous mass; cooling the periphery of said bed to a temperature below 400° F.; introducing oxygen and a normally gaseous aliphatic hydrocarbon having at least two carbon atoms per molecule into said reaction zone at a rate to provide a contact time of 5 to 15 seconds to provide a reaction mixture containing a substantial amount of peroxide compounds, withdrawing the reaction mixture, and recovering the peroxide compounds therefrom. The apparatus for making this method possible involves a modification of the reaction vessel normally associated with pebble heater apparatus. The modification comprises providing means to prevent contacting of the reactants with hot walls of the reaction vessel. This can be done by providing external indirect heat exchange to cool the walls of the reactor or by the use of a layer of cool pebbles adjacent the walls of the reactor. Both of these systems prevent contact of the reacted materials with metal surfaces which promote or catalyze decomposition of the desired products. Pebble heater apparatus is normally constructed of steel or iron and such materials promote the desired decomposition. The prior art has suggested reactors made of or lined with glass, quartz or metals which do not promote this decomposition but the production of such apparatus greatly increases the cost thereof and makes the use of a pebble heater prohibitively expensive.

The apparatus is shown in the drawing and attention is directed thereto. In this drawing the pebble heater apparatus is shown schematically with the reactor shown in section so that the novelty thereof can be easily seen. The upper chamber 11 is the pebble heater chamber, this being an upright elongated chamber, closed at its upper and lower ends by closure members 12 and 13 respectively. Located in enclosure member 12 is pebble inlet conduit 14. Gaseous effluent conduit 15 is provided in the upper end portion of pebble heater chamber 11, preferably in enclosure member 12. Inlet conduit 16, having flow control valve 17 provided therein, extends around the lower portion of pebble heater chamber 11, preferably, as header member 18, and communicates with the interior of that chamber through closure member 13.

Reaction chamber 19 is also an upright elongated chamber closed at its upper and lower end by closure members 21 and 22, respectively. Pebble conduit 23 extends between closure member 13 of pebble heater chamber 11 and the central portion of closure member 21 of reaction chamber 19. Inlet conduit 24, having flow control valve 25 provided therein, is connected to pebble conduit 23 so as to provide inlet means for sealing gas so as to seal the pebble heater chamber from the reaction chamber, thus preventing flow of combustion gas from the heating chamber to the reaction chamber or the flow of unreacted material or the reaction products from the reaction chamber to the pebble heater chamber.

Inlet conduit 27, having flow control valve 28 provided therein, extends into the lower portion of reaction chamber 19, preferably as header member 29. Outlet conduit 31 extends from the upper portion of the reaction vessel, this conduit communicating with conduit 32 connected as hereinafter described. The lower portion of conduit 23 is provided with a flaring or inverted funnel shaped member 33. This member 33 is spaced from the upper closure member 21 of reaction chamber 19. Conduit 32 communicates with the space defined by the inner surface of member 33 and with conduit 31. Surrounding and preferably concentric with pebble inlet conduit 23 is pebble inlet conduit 34.

Extending from the lower end of closure member 22 is pebble outlet conduit 35. Positioned within and preferably concentric with pebble conduit 35 is pebble outlet conduit 36, this conduit being provided with an outwardly flaring or funnel shaped member 37 extending upwardly into the lower portion of reaction chamber 19. Funnel shaped member 37 and closure member 22 define a pebble flow path. Pebble outlet conduit 35 extends from the bottom of reaction chamber 19 and is connected at its lower end portion to elevator 38. Pebble feeder 39 is provided intermediate the ends of pebble outlet conduit 35 and can be any conventional type of pebble feeder, such as a star valve, a gate valve, a vibratory feeder, or a rotatable table feeder. Elevator 38 can be any conventional type pebble elevator, such as a gas lift elevator or a mechanical elevator, such as a helical screw lift or a bucket elevator. Conduit 36 extends from the bottom of funnel member 37 and is connected at its lower end portion to elevator 41, this conduit being provided with a pebble feeder 42 which can be of any of the types above described. Likewise, elevator 41 can be any of the types suggested for elevator 38. The upper end of elevator 38 is connected to conduit 43 which communicates with a pebble cooler 44. Pebble cooler 44 is an upright chamber provided with closure members 46 and 47. Extending from the lower end portion of pebble cooler 44 is previously described conduit 34.

Extending from the upper end portion of elevator 41 is previously described conduit 14, this conduit being provided with pebble surge chamber 48. Conduit 49 with valve 51 therein extends to the upper end portion of pebble cooler 44.

Surrounding, and in heat exchange with, reaction chamber 19 is a second chamber 52 provided with inlet conduit 53 and outlet conduit 54.

From this description of the apparatus, the various methods of operation are believed to be clear to those skilled in the art. The apparatus is conventional pebble heater apparatus with certain fundamental modifications. In such apparatus pebbles are heated in the upper chamber 11 and passed into reaction chamber 19 where they supply the heat necessary to initiate and/or maintain the desired reaction therein. The added feature in the present invention comprises the means to prevent the contact of reacted gases with the sides of reaction chamber 19 at an elevated temperature. By the use of the heat exchange chamber surrounding reaction chamber 19 the walls of this chamber can be maintained below that at which undesirable reactions are obtained. This result can also be obtained by using a pebble bed, the moving mass of pebbles, containing pebbles of two different temperatures. Pebble flow through a reaction chamber is substantially linear with a very minor amount of mixing. Therefore, I provide means for introducing hot pebbles in the central portion of reaction chamber 19 and cool pebbles surrounding this hot pebble mass, these cool pebbles flowing between the hot pebble mass and the walls of reaction chamber 19. The figure illustrates different methods for pebble flow and these can be used separately or in combination. The use of a particular system will depend, in part, upon the particular reaction and reactants involved. Because flow through the reactor is substantially linear, it is only necessary to provide means for introducing cool pebbles adjacent the outer surface of the reaction chamber. Pebbles can be cooled to the desired temperature in pebble cooler 44 and these pebbles passed by conduit 34 into the upper portion of reaction chamber 19. Funnel shaped member 33 distributes these pebbles to the outer portion of reaction chamber 19. These cool pebbles can be removed from the lower portion of reaction chamber 19, flow being between closure member 22 and funnel shaped member 37. Then, by elevator 38, these cool pebbles can be elevated and cooled prior to reintroduction in cooling chamber 44. If a large amount of cooling is not necessary or if cooling chamber 44 can supply a considerable amount of cooling, feeder member 39 can be closed and all of the pebbles removed from the lower end of reaction chamber 19 by means of conduit 36. In this case, all of the pebbles are elevated by elevator 41 and a portion removed from surge chamber 48, this portion being supplied to pebble cooler 44 by means of conduit 49.

It will be seen that a considerable variety of operation is possible by use of this apparatus. It may be desirable to remove cool pebbles by conduit 35 and to supply additional pebbles to cooler 44 from those removed by conduit 36. Furthermore, it may be desirable to use cool pebbles at the periphery of the hot mass of pebbles and to use heat exchanger 52 to cool further the walls of the reaction chamber. In such operation, the cool pebbles serve to cool the reactants and the heat exchanger maintains the wall of the reaction chamber substantially below that permitting undesirable reactions.

Substantially all of the reactants are removed by conduit 32 although conduit 31 is provided to remove any reactants present in the zone between funnel shaped member 33 and closure member 21. Sealing gas introduced through conduit 24 eliminates gas flow between chambers 11 and 19.

The following specific example illustrates production of hydrogen peroxide by the method of this invention although, obviously, the invention is not specifically limited to these details.

*Example*

In one run approximately 33,800 standard cubic feet per hour of propane and 4,000 standard cubic feet of oxygen were fed to the reactor, this giving a propane to oxygen volume ratio of approximately 8.5:1. The feed was preheated to 100° F. and supplied at a pressure of about 15 p.s.i.g. The reactor was maintained at the pressure of about 10 p.s.i.g. The average temperature in the reactor was approximately 880° F., this temperature being maintained by supplying hot pebbles at a temperature of 850° F., these pebbles being removed at about 910° F., the reaction being an exothermic one. Annular pebbles were supplied at a temperature of 150° F., these pebbles being heated by contact with the hot pebbles and by contact with the reactant gases to about 300° F. Both the hot and cool pebbles were ⅜ inch diameter, smooth, ceramic pebbles. The product vapors included 28,900 standard cubic feet per hour of propane, 2,500 standard cubic feet per hour of propylene, 215 pounds per hour of hydrogen peroxide and 410 pounds per hour of water and other organic materials. The hydrogen peroxide was recovered by cooling the reactor effluent to about 100° F., the use of this elevated temperature minimizing the amount of organic compounds in the aqueous phase. This fractional condensation produces an aqueous hydrogen peroxide phase. By conventional fractionation, a separation of the other products is obtained and the propane is recycled to the reaction zone.

Although this example discloses the use of propane and oxygen, the invention is not limited thereto. Broadly, normally gaseous aliphatic hydrocarbons containing at least two carbon atoms per molecule are suitable. These include, for example, ethane, propane, normal butane, isobutane, cyclopropane, cyclobutane, and the like. Higher homologs of these compounds such as the pentanes, hexanes, cyclohexanes, can be used but with smaller yields. Some peroxides can be produced using unsaturated aliphatic hydrocarbons such as ethylene, propylene, etc., but since these olefins are a product of the process their use in the feed is not generally recommended.

The oxygen can be supplied by using commercial oxygen but it can also be supplied by using air or other oxygen containing gases. It is not necessary that the feed be free of other substances such as nitrogen, carbon monoxide or carbon dioxide although the presence of such diluents reduces the possible yield.

The solid heat exchange material, herein referred to as "pebbles" denotes any solid refractory material suitable of providing the desired heat and not catalyzing the reaction because the reaction is non-catalytic. Smooth, ceramic pebbles are especially suitable although they can be of glass, or of corrosion resistant metals. In size they can range from about ⅛ inch to about 1 inch in diameter although best results are obtained when the pebbles have a diameter of about ¼ to ⅜ inch.

In one specific embodiment, the pebbles can be pretreated with boric acid to improve the yield obtained. For best results, the volumetric ratio of hydrocarbon to oxygen should be at least 4:1, this range extending to about 10:1, a range of about 9:1 being preferred. The reaction period is short and flow should be designed to provide a contact time of about 5 to 15 seconds, a contact time of 10 seconds being quite suitable when using the preferred volumetric ratio.

The temperature for the production of peroxides can range from about 550 to 950° F., optimum yields of hydrogen peroxide being obtained within the temperature range of 825 to 950° F. Suitable pressures are slightly above atmospheric in order to remove the difficulty of vacuum operation but elevated pressures beyond 1 or 2 atmospheres are undesirable.

The gases should not contact the walls of the reaction chamber at a temperature above 400° F. because, at these temperatures, the desired products are decomposed. If the indirect heat exchange is used the walls of the reaction chamber are preferably maintained below 300°

F. When the annular bed of cool pebbles is used these should be supplied at a temperature below 400° F., preferably 150° F. or below. At these lower temperatures, hot reactive gases will be cooled so that they do not decompose on the reactor surfaces.

Because fairly high temperatures are used in the reaction zone, the cooling medium circulated in the indirect heat exchange zone should be ethylene glycol or a higher boiling material such as diphenyl. The choice of a particular fluid does not constitute a feature of my invention, such materials being well known in the art.

As many possible embodiments can be made of this invention without departing from the scope thereof, it is to be understood that all matter herein set forth is to be interpreted as illustrative and not as unduly limiting the invention.

I claim:

1. A method of operating pebble heater apparatus for producing peroxide compounds comprising the steps of heating a mass of pebbles in a pebble heating zone; gravitating the heated pebble mass downwardly through the central axial portion of a reaction zone as a contiguous mass; cooling a second mass of pebbles in a pebble cooling zone, passing said cooled mass of pebbles into the outer periphery of the upper portion of said reaction zone as a stream surrounding and enclosing said heated pebbles, said cooled pebble stream being in continuous and intimate contact with said heated pebble stream during its passage through the reaction zone thereby providing said reaction zone with a peripheral cool portion; introducing oxygen and a normally gaseous aliphatic hydrocarbon having at least two carbon atoms per molecule into said reaction zone at a rate to provide a sufficient contact time to produce a reaction mixture containing a substantial amount of peroxide compounds, withdrawing the reaction mixture, and recovering the peroxide compounds therefrom.

2. The method of claim 1 wherein said normally gaseous aliphatic hydrocarbon is propane.

3. A method of operating pebble heater apparatus for producing hydrogen peroxide comprising the steps of gravitating a first mass of pebbles through a pebble heating zone; passing hot gaseous material upwardly through and in direct heat exchange with said gravitating mass of pebbles in said pebble heating zone so as to raise the temperature of said pebbles within said pebble heating zone to a temperature within the range of 550 to 950° F.; removing gaseous effluent from the upper portion of said pebble heating zone; gravitating said heated pebble mass from the bottom of said pebble heating zone into the upper portion of a reaction zone as a single restricted pebble stream and downwardly through said reaction zone as a contiguous pebble mass; gravitating a second mass of pebbles through a pebble cooling zone; passing cool gaseous material upwardly through and in direct heat exchange with said second gravitating mass of pebbles so as to lower the temperature of said pebbles within said pebble cooling zone to a temperature below 400° F., removing gaseous effluent from the upper portion of said pebble cooling zone; gravitating said cooled pebble mass from the bottom of said pebble cooling zone into the outer periphery of the upper portion of said reaction zone as a stream completely surrounding and enclosing said heated stream, said cooled pebble stream being in continuous and intimate contact with said heated pebble stream during its passage through the reaction zone thereby providing said reaction zone with a peripheral cool portion; passing a normally gaseous aliphatic hydrocarbon having at least two carbon atoms per molecule and oxygen into the lower end portion of said reaction zone at a rate to provide a contact time of 5 to 15 seconds to produce a reaction product containing oxygenated compounds including water and hydrogen peroxide; withdrawing the reaction product from the reaction zone; cooling said product and fractionally condensing an aqueous hydrogen peroxide solution therefrom; removing said first mass of pebbles from the central portion of said reaction zone as a separate contiguous mass; returning said first mass of pebbles to said pebble heating zone; removing said second mass of pebbles from the outer periphery of the lower portion of said reaction zone as a separate contiguous mass; and returning said second mass of pebbles to said pebble cooling zone.

4. The method of claim 3 wherein said normally gaseous aliphatic hydrocarbon is propane.

5. The method of claim 3 wherein the periphery of said reaction zone is additionally cooled by indirect heat exchange with heat exchange material.

6. A method of operating pebble heater apparatus for producing hydrogen peroxide comprising the steps of gravitating a mass of pebbles through a pebble heating zone; passing hot gaseous material upwardly through and in direct heat exchange with said gravitating mass of pebbles in said pebble heating zone so as to raise the temperature of said pebbles within said pebble heating zone to a temperature within the range of 550 to 950° F.; removing gaseous effluent from the upper portion of said pebble heating zone; gravitating said heated pebble mass from the bottom of said pebble heating zone into the upper portion of a reaction zone as a single restricted pebble stream and downwardly through said reaction zone as a contiguous pebble mass; cooling a second mass of pebbles to below 400° F. in a pebble cooling zone; passing said cooled mass of pebbles into the outer periphery of the upper portion of said reaction zone as a stream completely surrounding and enclosing said heated pebble stream, said cooled pebble stream being in continuous and intimate contact with the heated pebble stream during its passage through the reaction zone; passing heat exchange material in indirect heat exchange with the peripheral portion of said reaction zone in an amount sufficient to reduce the temperature of the outer layers of pebbles to a temperature below 400° F., removing said heated and cooled pebbles as separate contiguous masses from the bottom portion of said reaction zone; returning said heated pebbles to said pebble heating zone and said cooled pebbles to said pebble coating zone; passing a normally gaseous aliphatic hydrocarbon having at least two carbon atoms per molecule and oxygen into the lower end portion of said reaction zone at a rate to provide a contact time of 5 to 15 seconds to produce a reaction product containing oxygenated compounds including water and hydrogen peroxide; withdrawing the reaction product from the reaction zone; cooling said product and fractionally condensing an aqueous hydrogen peroxide solution therefrom.

7. The method of claim 6 wherein said normally gaseously aliphatic hydrocarbon is propane.

8. Apparatus comprising, in combination: a pebble heater chamber in communication with the upper portion of a reaction chamber through a first pebble inlet conduit extending from the lower portion of said pebble heater chamber to the upper end of said reaction chamber and terminating in a flaring inverted funnel, said funnel forming, with the upper closure member of said reaction chamber, a first annular space; a second inlet pebble conduit in open communication with said first annular space to introduce cooled pebbles into the outer periphery of said chamber as an annular layer cooler than the pebbles from the pebble heater chamber; a reactant inlet conduit in the lower portion of said reaction chamber; a product outlet conduit extending from the upper portion of said chamber; an upwardly flared funnel positioned at the lower end of said reaction chamber and forming a second annular space therewith, the lower funnel being in communication with a first pebble elevating means; a third pebble conduit extending from the upper end of said first pebble elevating means to the upper end of the said pebble heater chamber; said second annular space being in communication with a second pebble elevating means;

a fourth pebble conduit extending from the upper end of said second pebble elevating means to a pebble cooling means, and said pebble cooling means being in communication with the aforesaid second inlet pebble conduit.

9. The apparatus of claim 8 wherein means are provided to divert pebbles in said third conduit to said cooling means.

10. The apparatus of claim 8 wherein a cooling jacket surrounds and is in heat exchange relationship with said reaction chamber, said cooling jacket being provided with inlet and outlet conduits.

11. The apparatus of claim 10 wherein means are provided to divert pebbles in said third conduit to said cooling means.

12. Apparatus comprising, in combination: a pebble heater chamber in communication with the upper portion of a substantially unobstructed closed reaction chamber through a first pebble inlet conduit extending from the lower portion of said pebble heater chamber to the upper end of said reaction chamber and terminating in a flared inverted funnel, said funnel forming with the upper closure member of said reaction chamber a first annular space; a second inlet pebble conduit in open communication with said first annular space to introduce cooled pebbles into the outer periphery of said chamber as an annular layer cooler than the pebbles from the pebble heater chamber; a reactant inlet conduit in the lower portion of said reaction chamber; a product outlet conduit extending from the upper portion of said chamber; a second funnel positioned at the lower end of said reaction chamber and forming a second annular space therewith; said second funnel being in communication with a first pebble elevating means; a third conduit extending from the upper end of said first pebble elevating means to the upper end of said pebble heater chamber; means to heat the pebbles in said pebble heater chamber; said second annular space being in communication with a second pebble elevating means; the upper end of said second elevating means being in communication with a pebble cooling means; a diversion conduit connecting said third conduit with said cooling means; means to divert the flow of pebbles from said third conduit to said diversion conduit; means to cool said pebbles in said pebble cooling means; and said pebble cooling means being in communication with the aforesaid second inlet pebble conduit.

13. The apparatus of claim 12 wherein a cooling jacket surrounds and is in heat exchange relationship with said reaction chamber, said cooling jacket being provided with inlet and outlet conduits.

References Cited in the file of this patent

UNITED STATES PATENTS

| | | |
|---|---|---|
| 2,348,156 | Sheppard | May 2, 1944 |
| 2,479,111 | Harris | Aug. 16, 1949 |
| 2,513,995 | Eastwood et al. | July 4, 1950 |
| 2,533,581 | Harris | Dec. 12, 1950 |
| 2,759,881 | McIntire | Aug. 21, 1956 |
| 2,772,225 | Bergstrom et al. | Nov. 27, 1956 |